United States Patent Office 2,796,826
Patented June 25, 1957

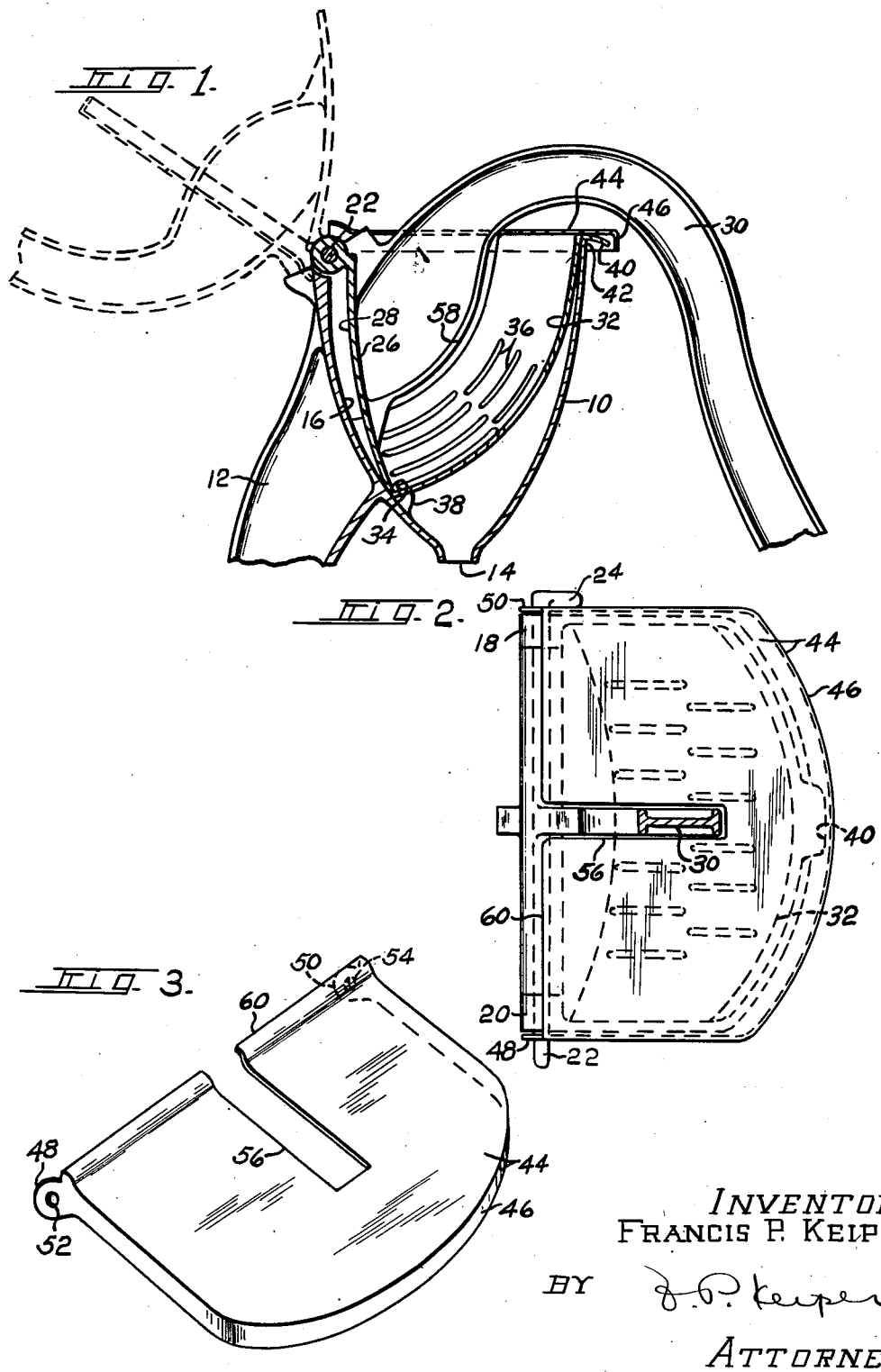
June 25, 1957     F. P. KEIPER     2,796,826
FRUIT PRESS
Filed Sept. 16, 1954
INVENTOR
FRANCIS P. KEIPER
BY
ATTORNEY

2,796,826
FRUIT PRESS

Francis P. Keiper, Syracuse, N. Y.

Application September 16, 1954, Serial No. 456,422

2 Claims. (Cl. 100—126)

This invention relates to juice extractors and more particularly to an improvement over the type of extractor shown in Letters Patent No. 1,886,250, granted November 1, 1932.

In extractors of the type referred to, which comprise a bowl, and a pivoted press plate adapted to squeeze fruit against a wall thereof, juice and fruit pulp splatter from the top of the bowl during the pressing operation. It is an object of the present invention to provide a hinged cover plate for the bowl which will be operative to automatically cover the bowl upon each extraction operation, and expose the open end of the bowl following or prior to extraction to afford ready access for the removal of fruit from which the juice has been extracted, or the insertion of fruit for extraction. The invention further provides for the ready disassembly of the parts so that the parts can be washed or flushed for cleaning.

The above and other novel features of the invention will appear more fully hereinafter from the following detailed description, when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

Figure 1 is a fragmentary vertical sectional view through the juice extractor with the cover plate in operative position;

Figure 2 is a top plan view of the extractor with the operating lever cut away; and Figure 3 is a perspective view of the cover plate.

In the drawings there is shown a bowl 10 adapted to be supported upon an integral pedestal 12, the latter having spaced feet (not shown), which may embrace a receptacle below the spout 14 of the bowl 10. The bowl has a fruit press surface 16 and along the upper edge thereof are spaced pivot pin bearings 18 and 20. Extending through the pivot pin bearings 18 and 20 is a pin 22 having a finger grip 24 at one end for its ready removal, and pivoted on the pin in a hinge-like manner is a presser plate 26 having a pressing surface 28 facing the bowl surface 16. Cast rigidly with the plate 26 is an operating handle or lever 30.

Within the bowl is a removable strainer plate 32, having a curved inner surface conforming closely to the arcuate travel of the edge 34 of the presser plate 26. The strainer plate has a plurality of slots 36 to permit flow of juice therethrough and the plate at its lower end rests upon an abutment 38 and is provided at its upper end with a flange 40 adapted to extend over the upper edge 42 of the front wall of the bowl.

In order to prevent splash of pulp and juice from the fruit during the pressing operation, there is provided a cover plate 44 having a depending flange 46 adapted to extend around the sides and front of the bowl and the flange 40 of the strainer plate. The rear extremities of the flange are provided with enlargements 48 and 50, which enlargements have apertures 52 and 54 which are adapted to be pivotally mounted upon the pin 22 immediately outside of the bearings 18 and 20. The plate has a central radial slot 56 extending from the back edge thereof through which the lever 30 may extend. The radial length of such slot is sufficient to embrace the arcuate portion 58 of the lever 30, which portion projects into the bowl during the actual squeezing operation, the arcuate portion of the lever tending to substantially close the slot during squeezing.

It will be seen that when the lever 30 is swung back to the dotted line position shown in Figure 1, that the plate 44 is automatically also swung clear of the bowl so that fruit may be placed in the bowl ready for extraction. As soon as the lever 30 is swung to the squeezing position, the cover plate 44 is automatically swung into position over the open top of the bowl prior to exerting pressure on fruit positioned between the presser plate 28 and the bowl wall 16. Thereafter during the squeezing of the fruit, the cover plate 44 remains in operative position and prevents pulp and juice from escaping or being ejected from the top of the bowl. The upper plate is flared at the rear as at 60 so as to overlie at least a portion of the bearings 18 and 20 and the pin receiving portion of the presser plate 26.

It will thus be seen that the cover plate is effective to prevent splash upon the operator of the fruit press, and such cover plate is automatically caused to move from the inoperative to the operative position on each pressing operation. Further, the cover plate is returned to the inoperative position when the pressing operation is concluded, and the fruit rind removed. It will also be seen that by removal of the pin 22 that the various parts of the press may be disassembled for cleaning and thereafter quickly reassembled to render the same ready for use.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A juice extractor comprising a bowl, pivot pin bearings formed along the upper edge of one side of said bowl, a pivot pin disposed in said bearings and extending parallel with and adjacent the said edge of the bowl, a presser plate pivoted on said pin and adapted to be swung on said pin to press fruit between a pressing surface side of the plate and said one side of said bowl, a lever integrally attached to the opposite side of said plate and having a portion adapted to extend partially into the bowl during fruit pressing, a relatively flat cover plate for said bowl freely pivoted on said pin independent of said presser plate and adapted to overlie the bowl during juice extraction by said presser plate, said cover plate having an aperture therein through which said lever projects, said aperture extending radially from the pivot pin a distance sufficient to permit passage therethrough of said portion of said lever that enters the bowl during pressing, said cover plate being adapted to be swung with the presser plate out of the way upon upward movement of said presser plate out of the bowl, and said cover plate being adapted to be returned to bowl in covering relation upon movement of said presser plate into the bowl preparatory to actual presser operation.

2. A juice extractor comprising a bowl, pivot pin bearings formed along the upper edge of one side of said bowl, a pivot pin disposed in said bearings and extending parallel with and adjacent the said edge of the bowl, a presser plate pivoted on said pin and adapted to be swung on said pin to press fruit between a pressing surface side of the plate and said one side of said bowl, a lever integrally attached to the opposite side of said plate and having a portion adapted to extend partially into the bowl during fruit pressing, a relatively flat cover plate for said bowl freely pivoted on said pin independent of said presser plate and adapted to overlie the bowl during juice extraction by said presser plate, said cover plate having an aperture therein through which said lever projects, said aperture extending radially from the pivot pin a distance sufficient to permit passage therethrough of said portion of said lever that enters the bowl during pressing, the portion of said lever extending into said bowl during juice extraction having an arcuate forward surface concentric with the pivot pin to substantially close the cover plate slot during extraction, said cover plate being adapted to be swung with the presser plate out of the way upon upward movement of said presser plate out of the bowl, and said cover plate being adapted to be returned to bowl covering relation upon movement of said presser plate into the bowl preparatory to actual presser operation.

References Cited in the file of this patent

UNITED STATES PATENTS

| | | |
|---|---|---|
| 172,505 | Sammis | Jan. 18, 1876 |
| 633,247 | Middlekauff | Sept. 19, 1899 |
| 796,341 | Middlekauff | Aug. 1, 1905 |
| 952,519 | Gilchrist | Mar. 22, 1910 |
| 1,088,123 | Browning | Feb. 24, 1914 |
| 1,886,250 | Bungay | Nov. 1, 1932 |
| 1,939,307 | Majewski | Dec. 12, 1933 |
| 2,535,553 | Stoner | Dec. 26, 1950 |